(12) United States Patent
Salameh

(10) Patent No.: US 8,876,117 B2
(45) Date of Patent: Nov. 4, 2014

(54) TOLERANCE-OPTIMIZED SEALED JOINT AND PRODUCTION METHOD

(75) Inventor: Ralf Salameh, Gondelsheim (DE)

(73) Assignee: Federal-Mogul Sealing Systems, Herdorf (DE)

( * ) Notice: Subject to any disclaimer, the term of this patent is extended or adjusted under 35 U.S.C. 154(b) by 0 days.

(21) Appl. No.: 13/825,193

(22) PCT Filed: Aug. 9, 2011

(86) PCT No.: PCT/EP2011/063693
§ 371 (c)(1),
(2), (4) Date: Mar. 20, 2013

(87) PCT Pub. No.: WO2012/038147
PCT Pub. Date: Mar. 29, 2012

(65) Prior Publication Data
US 2013/0183083 A1  Jul. 18, 2013

(30) Foreign Application Priority Data

Sep. 20, 2010  (DE) .......................... 10 2010 041 067

(51) Int. Cl.
| | |
|---|---|
| *B23P 19/04* | (2006.01) |
| *F16J 15/02* | (2006.01) |
| *F16J 15/06* | (2006.01) |
| *F16J 15/08* | (2006.01) |

(52) U.S. Cl.
CPC .............. *F16J 15/021* (2013.01); *F16J 15/061* (2013.01); *F16J 15/0818* (2013.01); *B23P 19/04* (2013.01); *F16J 2015/0856* (2013.01); *F16J 2015/0868* (2013.01)

USPC .......................................... 277/598; 403/288

(58) Field of Classification Search
CPC ..... F16J 15/021; F16J 15/061; F16J 15/0818; F16J 15/0831
USPC ............... 403/288, 408.1, 337; 277/594, 596, 277/597, 640
See application file for complete search history.

(56) References Cited

U.S. PATENT DOCUMENTS

| | | | | |
|---|---|---|---|---|
| 2,576,673 | A * | 11/1951 | Cole ............................. | 277/380 |
| 4,529,214 | A * | 7/1985 | Stoll et al. ..................... | 277/607 |
| 4,602,125 | A * | 7/1986 | West et al. ................ | 174/138 G |
| 4,757,560 | A * | 7/1988 | Grimstad ......................... | 4/417 |
| 4,867,461 | A * | 9/1989 | Shimmell ...................... | 277/593 |
| 5,513,603 | A * | 5/1996 | Ang et al. .................. | 123/90.37 |
| 6,676,135 | B2 * | 1/2004 | Carey ............................ | 277/594 |
| 2005/0044689 | A1 | 3/2005 | Yetter | |
| 2008/0290609 | A1* | 11/2008 | Seibert et al. ................. | 277/596 |
| 2011/0148049 | A1* | 6/2011 | Lesnau et al. ................. | 277/630 |

FOREIGN PATENT DOCUMENTS

| | | |
|---|---|---|
| DE | 10 2004 027843 A1 | 1/2006 |
| DE | 10 2007 020160 A1 | 10/2008 |
| WO | WO 2011/075717 A1 | 6/2011 |

* cited by examiner

*Primary Examiner* — Joshua Kennedy
(74) *Attorney, Agent, or Firm* — Robert L. Stearns; Dickinson Wright, PLLC

(57) ABSTRACT

A supporting frame seal includes a supporting frame with at least one inner opening; at least one sealing element which surrounds the inner opening; and at least one elastomer pin which projects from a first side of the supporting frame. The supporting frame has an opening which is aligned with the at least one elastomer pin.

7 Claims, 3 Drawing Sheets

Comparative Example

Comparative Example

TOLERANCE-OPTIMIZED SEALED JOINT AND PRODUCTION METHOD

BACKGROUND OF THE INVENTION

1. Technical Field

The present invention relates to an improved seal, more particularly a supporting frame seal, which is optimised in terms of the determination and observance of positioning and assembly tolerances, as well as a corresponding production method.

2. Related Art

In the field of supporting frame seals there are more and more systems in which seals are joined to other components and then supplied to the assembly belt as a system or module. To connect, for example, supporting frame seals with metal oil sumps elastomer pins are moulded onto the supporting frames and are then pressed into corresponding openings in the metal oil sump.

As in newer systems the components and thereby the flange surfaces are steadily becoming smaller, all avoidable system tolerances have to be eliminated. These tolerances could lead to seal which has been assembled and supplied as component with an oil sump no longer resting completely on the housing of the component flange as a result of which leaks could occur. In order to keep the system tolerances as small as possible, the requirement is therefore that all system components, e.g. seals and the oil sump, have jointly corresponding fixing points or zero points. Ideally the components are then attached to each other at these zero points so that further tolerances can be eliminated and thereby additional tolerance chains avoided.

At present this requirement cannot be rationally implemented in certain types of sealing modules (e.g. metal oil sumps with a supporting frame seal and elastomer fixation pins). The problem is that basically the central point of an elastomer assembly pin should be selected as the zero point of the seal. In order to obtain minimum system tolerances, for the dimensioning and tolerancing of the hole pattern and flange surface opening of the oil sump a centring pin of the seal and an opening in the oil sump into which the centring pin is inserted are required as the zero point.

If the elastomer pin is selected as the zero point, this results in the metrological problem that the elastomer pin usually has a relatively small diameter and is of course naturally flexible as it is made of elastomer. In addition, influences such as material shrinkage and deformation make alignment on the elastomer pin very difficult and call into question the measurement of the entire component.

If, on the other hand, a screw opening in the metal support is selected as the zero point the component (essentially the hole pattern and thus the position of the sealing lips) can be metrologically recorded very well, though there is then an additional measuring section with tolerance to the moulded-on elastomer pin which often cannot be accepted because of the small flange overlap.

In both variants the following problem exists in connection with the metal supporting frame: during the production of the metal supporting frame it can only be rational to select the identical zero point for production and subsequent measuring of the component. Only in this way are there minimum deviations. The problem is that in the case of the known embodiments the pin is moulded into the metal surface of the supporting frame. Here, a channel is generally engraved via which the pin is filled with elastomer. The center point of the pin lies above this surface or on the supporting frame on this engraved surface. If the center is defined at this point it cannot in principle be measured on the component as graphically it is defined on a flat surface and thus lies on a metal surface.

It is known that in the case of components in which additional tolerances are not acceptable it is nevertheless decided to place the zero point on the pin, even if the evident metrological definition can subsequently lead to problems and the result is not always clear. So that the corresponding hole patterns in the case of supporting frame seals can be clearly measured, a zero point is then after all selected on the supporting frame in one of the screw holes close to the centring pin, even if this is not the optimum solution. The risk of selecting a metrologically not clearly definable zero point on the component, and the problem resulting from this of having a metrologically only inadequately determined and verifiable hold pattern on the supporting frame should be seen as a major problem in known components.

SUMMARY OF THE INVENTION

The objective is therefore to develop a solution which no longer exhibits all these drawbacks and guarantees ideally functioning interaction and can also be easily verified and demonstrated in metrological terms. Subcomponents such as the supporting frame of a seal should be integrated.

The invention described below relating to a supporting frame seal as well as a method of production thereof allows all said specifications to be implemented and thereby to define the zero point in the area of the centring pin without having to accept the known and described disadvantages.

In accordance with a first aspect of the invention a supporting frame seal is provided which comprises:
- a supporting frame with at least one inner opening;
- at least one sealing element which surrounds the inner opening; and
- at least one elastomer pin which projects from one side of the supporting frame;

whereby
- the supporting frame has an opening which is aligned with the at least one elastomer pin.

In accordance with another form of embodiment the at least one elastomer pin is solid.

According to one form of embodiment the at least one elastomer pin has an opening which is aligned with the corresponding opening in the supporting frame.

In accordance with one form of embodiment the at least one elastomer pin extends partially into the corresponding opening so that only the inner edge of the corresponding opening is covered with elastomer.

According to one form of embodiment the at least one elastomer pin has an undercut. In this way security against loss can be provided.

According to one form of embodiment the at least one elastomer pin is designed in one piece with the at least one sealing element.

In accordance with a second aspect of the invention a method of producing a supporting frame seal is provided comprising:
- the provision of a supporting frame with at least one inner opening;
- the provision of the supporting frame with at least one opening;
- the application of at least one sealing element which surrounds the opening on a first side of the supporting frame;
- the moulding-on of at least one elastomer pin so that the latter projects from the first side of the supporting frame and is aligned with the at least one opening.

In accordance with one form of embodiment the at least one elastomer pin is solid.

According to one form of embodiment the method comprises, in addition to the provision of the supporting frame with the at least one opening:

the accommodation of the supporting fame in an moulding tool, whereby the pin engages flush in the at least one opening;

whereby the moulding on of the at least one elastomer pins is carried out in such a way that it receives an opening which is aligned with the corresponding opening in the supporting frame.

In accordance with one form of embodiment the moulding on of the at least one elastomer pin is carried out in such a way that only the inner edge of the corresponding opening is covered with elastomer.

According to one form of embodiment the moulding on of the at least one elastomer pin is carried out so that the elastomer pin is provided with an undercut.

In accordance with one form of embodiment the at least one sealing element and the at least one elastomer pin are jointly moulded on in one piece.

THE DRAWINGS

DETAILED DESCRIPTION

Figure 1:
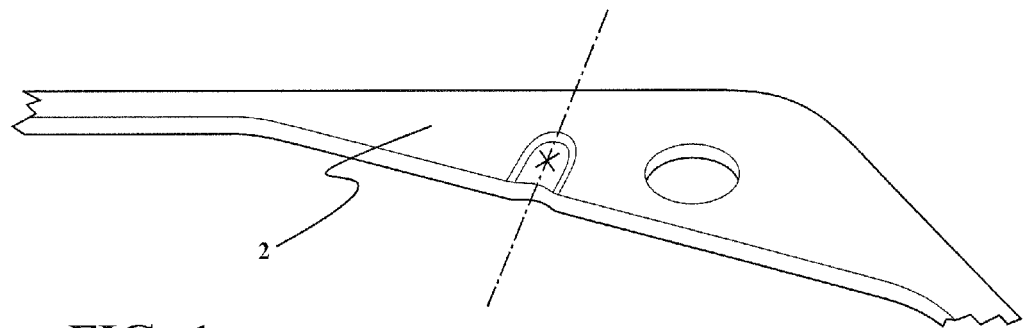
FIG. 1 shows a view of a supporting frame of a conventional supporting frame seal.

FIG. 1 shows a view of a section of the supporting frame 2 of a conventional supporting frame seal. At the point marked X there will be an elastomer pin in the completed supporting frame seal. In the case of this seal an elastomer sealing element is to be applied on the inner edge. The elastomer pin is then to be moulded on in one piece together with the elastomer sealing element. So that elastomer can securely reach the point marked X and form the elastomer pin a channel-like groove or engraving is provided. The problem in this conventional seal is that the elastomer pin cannot be directly measured as it lies in the metal plane.

Figure 2:
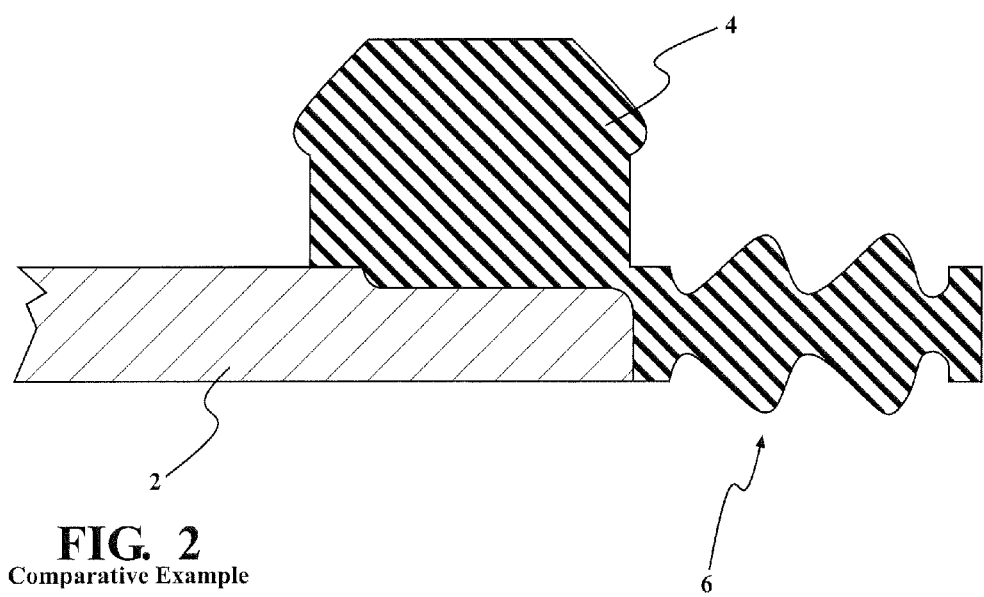
FIG. 2 shows a cross-section of the supporting fame seal in FIG. 1.

FIG. 2 shows a cross-section along the dashed line in FIG. 1, with the sealing element 6 and elastomer pin 4 already moulded on. It should be noted that in this figure the right side corresponds to the inner edge of the supporting frame in FIG. 1. The only possibility of measuring the zero point of the elastomer pin is measuring the pin itself, or its tip. As stated above this does not permit reliable measurement, among other things because of the flexible properties of the elastomer and the distance between the pin tip and plane of the screw holes etc. in the supporting frame which introduces additional undesirable tolerances.

To solve this problem the present invention proposes an improved supporting frame seal. A first form of embodiment is shown in a view from above in FIG. 3. The supporting frame 2 of a corresponding seal is provided with an additional opening 8 at the position of the elastomer pin to be moulded on.

Figure 3:
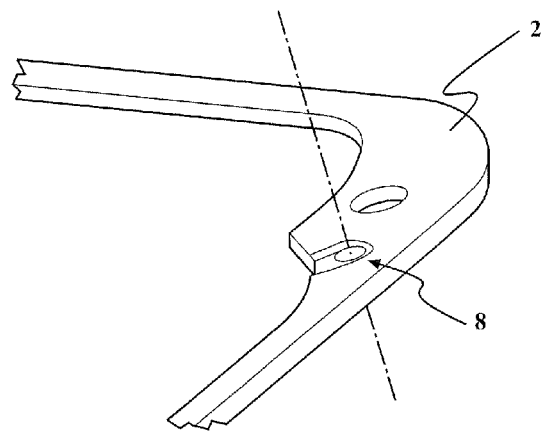
FIG. 3 show a view of a supporting frame of a supporting frame seal in accordance with a first embodiment of the invention.
Figure 4:
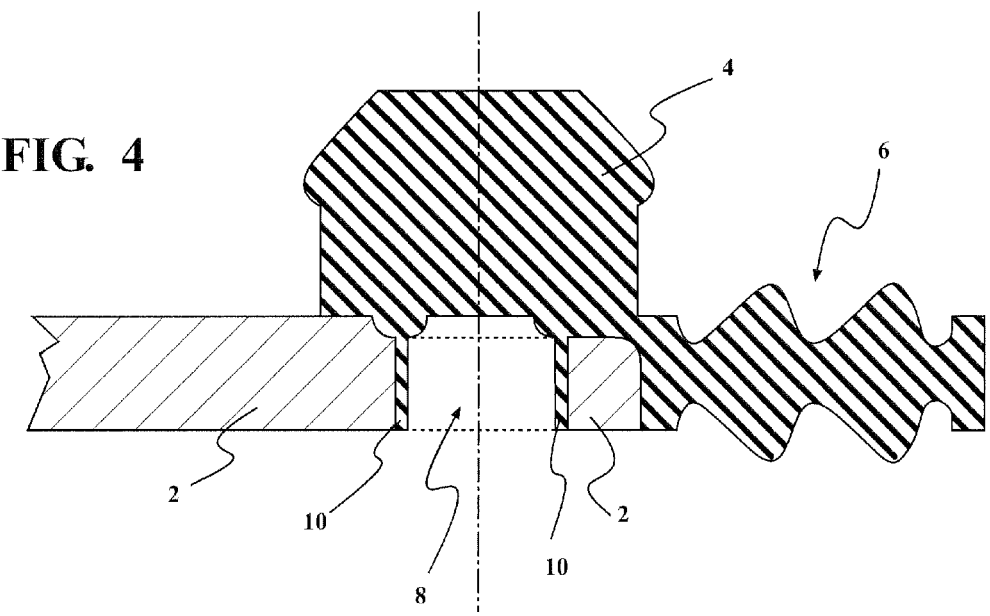
FIG. 4 shows a cross-section of the supporting frame seal in FIG. 3.

FIG. 4 shows a cross-section of the form of embodiment in FIG. 3 with the sealing element 6 and the elastomer pin 4 already moulted on. It should be noted that the right side in the figures correspond to the inner edge of the supporting frame in FIG. 3 in each case.

In this example the elastomer pin 4 is solid, i.e. it closes the opening 8 above the level of the supporting frame 2. However, a spur at the foot of the elastomer pin 8 extends into the opening 8 in such a way that its inner edge is covered with a thin elastomer layer 10.

The supporting frame of the seal must rationally have the zero point as the basis of measuring the hole pattern and sealing geometry at the point of the centring pint (zero point of the seal). In accordance with the invention the zero point on the support frame is clearly metrologically defined at this point in that an additional opening 8 is also stamped in on the supporting frame 2 at this point. By way of this opening 8 the zero position can be clearly determined and measured. Advantageously, in accordance with one form of embodiment this opening 8 can be stamped in together with the screw openings, is preferably round and has a diameter of, for example, approximately 3 mm.

The elastomer moulding tool in which the supporting frame 2 is laid in order to mould on the elastomer sealing lips 6 and the centring and fastening pin must be specially designed in the area of the centring pin 4 that marks the zero point. The supporting frame 2 must be fixed in the tool at precisely the point "zero point of the supporting frame and subsequent seal" so that there are minimal tolerances between the moulded-on centring pin 4 and the stamped holed pattern of the seal.

At this point the tool is designed in such a way that, for example, a metal pin engages in the opening 8 of the supporting frame 2 and then securely localizes and fixes the metal section. Advantageously the pin is rounded on the side projecting from the tool or has an introduction slope so that the supporting frame 2 can be positioned more easily. In the embodiment according to the invention the coordination between the centring pin and hold diameter in the supporting frame 2 is selected so that on injection of the elastomer a very thin elastomer layer 20 is formed between the centring pin 4 and supporting frame 2. This layer can be from a few hundredths of a millimeter to several tenths of a millimeter thick and is selected precisely so that although circumferentially closed, it is no thicker than absolutely necessary to form the closed elastomer geometry around the fixing pin 4. This very thin elastomer layer 10 has various tasks.

The elastomer layer 10 between the centring pin 4 and the metal frame 2 ensures that the finished component can be easily removed from the mould. In the case of purely metallic contact greater tolerances have to be selected in order to prevent jamming of the component.

Another important function of this elastomer layer 10 is the direct dependence and unchangeability of the correlation between the elastomer layer 10 and the centring pin 4, as both are precisely predefined in the tool and the relative position thereby fixed exactly. This means that the position of the, for example circular, elastomer layer in the opening directly below the elastomer pin 4 corresponds precisely with the position and location of the zero point and thus the centring pin 4 above it. After removing the seal from the tool, precisely at the point of the zero point, on the opposite side of the centring pin 4 there is a circular opening 8 on which the zero point for the measurement can be determined.

An essential advantage of this solution is also that with a very thin elastomer layer 10 in the opening it is supported by the supporting frame 2 directly beneath it and due to the non-compressible material behaviour of elastomers in the thin layer practically no longer exhibits any flexibility. Also, like all other elastomer areas this thin elastomer layer 10 is vulcanised onto the supporting frame 2.

This provides a good possibility of clearly determining the zero point of the finished component and unambiguously measuring the hole pattern of the seal relative to this point.

Figure 5:
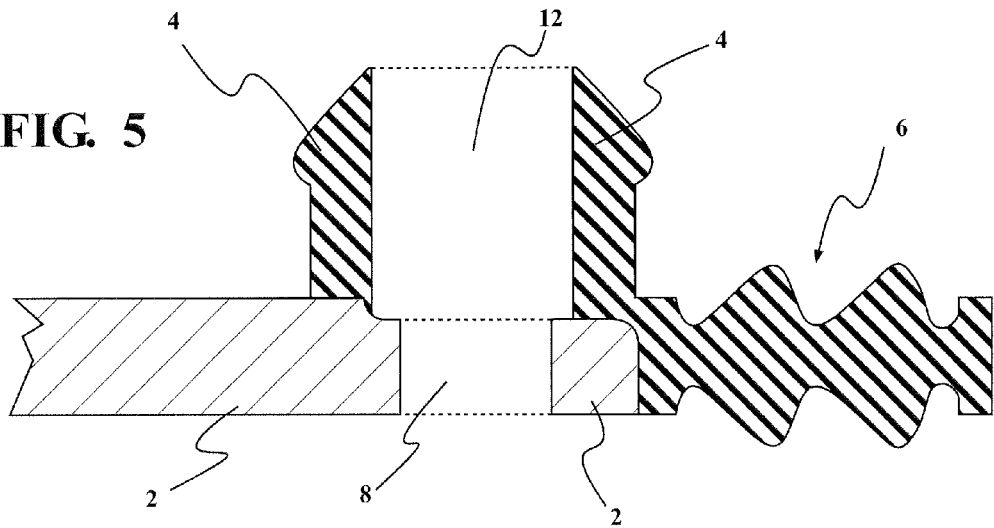
FIG. 5 shows a cross section of a supporting frame seal in accordance with a second form of embodiment of the invention.

In the second form of embodiment, which is shown in cross-section in FIG. 5, the supporting frame 2 is also designed with a corresponding, for example, round, but in general at least point symmetrical opening 8 in the supporting frame 2 precisely at the point at which the elastomer centring pin 4 (zero point) is located.

The corresponding production tool is designed so that the frame 2 can be precisely held and centred at this point above a pin. However, in addition in this form of embodiment through the injection tool the inner area 12 of the pin 4 is kept clear during injection of the elastomer and is not filled with elastomer. After moulding on of the pin 4 this also provides the possibility of using the opening 8 in the supporting frame 2 to determine the zero point.

The advantage of this solution is that through the sealing around the centring opening, after removal of the seal from the tool it is completely free of elastomer. The exact correlation of the elastomer pin 4 to the position of the opening 8 is therefore determined in this solution in that the pin position and the moulded on pins 4 are precisely fixed in the tool with minimum tolerances.

In contrast to the above-described first form of embodiment, in a second form of embodiment the centring pin 4 may only have a such small "play" with regard to the opening 8 in the supporting frame 2 that it can only just be assembled and removed again after the injection moulding process.

A further advantage of this form of embodiment is that through the inner recessing 12 the pin 4 can be assembled in openings more easily, though through the circular form the clamping effect remains largely at the same level as in a fully filled or solid pin in an form of embodiment such as in FIG. 4.

Figure 6:
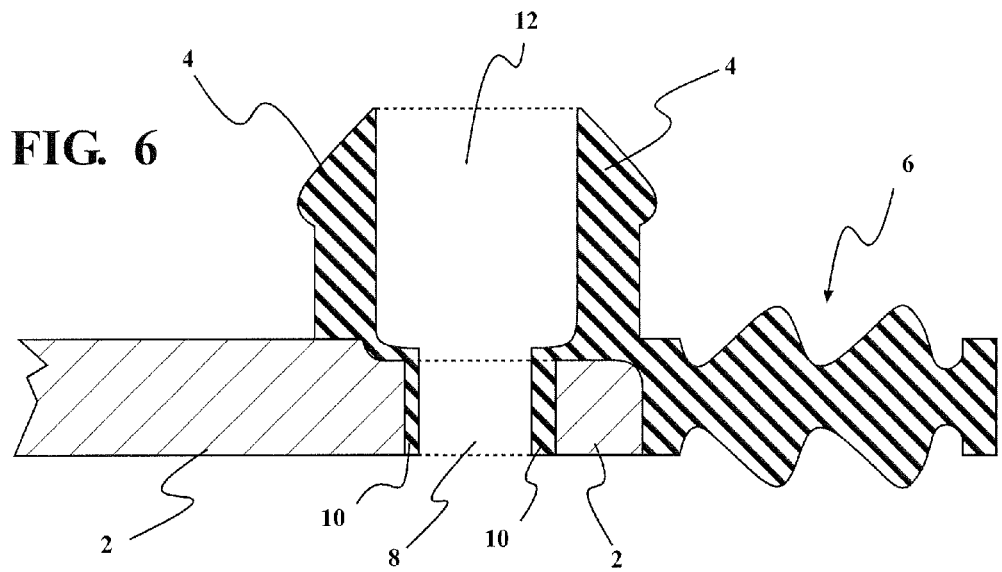
FIG. 6 shows a cross-section of a supporting frame seal in accordance with a third form of embodiment of the invention.

In a third example of embodiment which is shown in cross-section in FIG. 6, the elements of the two forms of embodiment described above are combined. In this form of embodiment the pin 4 is designed with a hollow cavity 12 as in the second form of embodiment in accordance with FIG. 5. The opening 8 in the supporting frame 2 is also provided with a very thin elastomer layer 10 on injection as in the first form of embodiment.

As the position of the pin 4 and in turn, the position of the elastomer layer 10 is precisely predefined in the tools, it can be used for the measurement. The great advantage of this solution consists in the fact that due to the open pin 4 the elastomer-coated opening 8 in the area of the supporting frame 2 can be directly reached by a measuring machine, for example. The continuous opening 8, 12 only makes the use of certain measuring methods possible in the first place (for example optical methods).

In the above-described examples of embodiment on pin has been described in each case. It is, however, self-evident that a seal in accordance with the invention can also have several elastomer pins which can all be located on the same side of the supporting frame or on different and/or opposite sides.

The position and shape of the sealing element is not restricted to the examples of the shapes in the FIGS. 4 to 6, but can also be designed differently. More particularly, instead of being provided on the inner edge of the supporting frame, the sealing element can also or additionally be located on both sides of the supporting frame. The sealing element does not necessarily have produced in one piece with the elastomer pin(s).

The invention can generally be used for all types of supporting frame seals, for example for supporting frame seals for oil sumps.

The invention offers the following advantages among others. Optimum tolerance-related designed of an "oil sump with seal" module is made possible. The elimination of the influences of different zero points on components on the components and on the finished article is achieved, as is the elimination of influences which are present in measurements on flexible elastomer pins. Optimum measurement of supporting frame seals is guaranteed in terms of the subsequent important tolerance dimensions.

What is claimed is:

1. A supporting frame seal comprising
a supporting frame with an inner edge presenting an inner opening;
at least one sealing element which surrounds the inner edge and projects into the inner opening and extends along a portion of a first side of the supporting frame adjacent the inner edge; and
at least one elastomer pin which projects from the first side of the supporting frame for pressing into a corresponding opening in an oil sump;
wherein
the supporting frame has at least one second opening, each second opening is aligned with one elastomer pin, the center axis of each elastomer pin is solid from a point longitudinally aligned with an uppermost surface of the first side of the supporting frame continuously to a distal end, the elastomer pin closes the aligned second opening, and each elastomer pin partially extends into the aligned second opening so that only the inner edge of the aligned second opening is covered with elastomer.

2. The supporting frame seal according to claim 1, wherein the at least one elastomer pin has an undercut.

3. The supporting frame seal according to claim 1, wherein the at least one elastomer pin is produced in one piece with the at least one sealing element.

4. The supporting frame seal according to claim 1, wherein the at least one elastomer pin projects from the first side of the supporting frame to the distal end, and the at least one elastomer pin does not have an opening extending continuously from the first side of the supporting frame to the distal end.

5. The supporting frame seal according to claim 1, wherein the portion of each elastomer pin extending into the aligned second opening of the supporting frame includes a thin layer extending into the aligned second opening, the thin layer extends continuously from the first side of the supporting frame to a second side of the supporting frame facing opposite the first side, and the thin layer has a thickness which is constant from the first side to the second side of the supporting frame.

6. The supporting frame seal according to claim 5, wherein the thickness of the thin layer is less than one millimeter.

7. The supporting frame seal according to claim 6, wherein the second opening of the supporting frame aligned with the elastomer pin has a diameter of approximately 3 millimeters.

* * * * *